US007467669B2

(12) United States Patent
Friberg et al.

(10) Patent No.: US 7,467,669 B2
(45) Date of Patent: Dec. 23, 2008

(54) METHOD FOR GOVERNING THE OPERATION OF A PNEUMATIC IMPULSE WRENCH AND A POWER SCREW JOINT TIGHTENING TOOL SYSTEM

(75) Inventors: John Robert Christian Friberg, Nacka (SE); Knut Christian Schoeps, Tyresö (SE); Torbjörn Rafael Sjöblom, Årsta (SE); Erland Karlberg, Sundbyberg (SE)

(73) Assignee: Atlas Copco Tools AB, Nacka (SE)

( * ) Notice: Subject to any disclaimer, the term of this patent is extended or adjusted under 35 U.S.C. 154(b) by 94 days.

(21) Appl. No.: 10/584,326

(22) PCT Filed: Dec. 27, 2004

(86) PCT No.: PCT/SE2004/002020

§ 371 (c)(1),
(2), (4) Date: Jun. 26, 2006

(87) PCT Pub. No.: WO2005/063448

PCT Pub. Date: Jul. 14, 2005

(65) Prior Publication Data

US 2007/0151740 A1 Jul. 5, 2007

(30) Foreign Application Priority Data

Dec. 29, 2003 (SE) .................................... 0303555

(51) Int. Cl.
*G05B 15/00* (2006.01)

(52) U.S. Cl. ........................... 173/1; 173/180; 173/181; 173/182; 173/183; 173/176

(58) Field of Classification Search ..................... 173/1, 173/180–183, 176; 73/862.23
See application file for complete search history.

(56) References Cited

U.S. PATENT DOCUMENTS 4,305,741 A * 12/1981 Sarcia ........................ 173/183
4,846,285 A 7/1989 Otto
4,959,797 A * 9/1990 McIntosh .................... 700/275

(Continued)

FOREIGN PATENT DOCUMENTS

EP 0502748 A1 9/1992

(Continued)

*Primary Examiner*—Rinaldi I. Rada
*Assistant Examiner*—Michelle Lopez
(74) *Attorney, Agent, or Firm*—Frishauf, Holtz, Goodman & Chick, P.C.

(57) ABSTRACT

A method and a power tool system are provided for performing screw joint tightening using a pneumatic torque impulse power tool that is controlled by a control unit. A torque magnitude and a torque growth are calculated based on signals delivered by an angle sensor, and pressurized air is supplied to the power tool via a flow regulating valve which is successively adjustable between zero and full power flow. The flow regulating valve is controlled by the control unit to deliver a reduced power air flow to the power tool before and during a first delivered impulse, and then to deliver full power flow until a certain torque magnitude or a percentage of a target torque level is reached, whereafter the air supply flow is again reduced until the target torque level is reached, and when the target torque level is reached the air flow is shut off.

4 Claims, 2 Drawing Sheets

U.S. PATENT DOCUMENTS

| | | | | | |
|---|---|---|---|---|---|
| 5,215,270 | A * | 6/1993 | Udocon et al. | 29/407.02 |
| 5,315,501 | A * | 5/1994 | Whitehouse | 700/32 |
| 5,366,026 | A | 11/1994 | Maruyama et al. | |
| 5,439,063 | A | 8/1995 | Anders et al. | |
| 5,457,866 | A | 10/1995 | Noda | |
| 5,492,185 | A * | 2/1996 | Schoeps et al. | 173/177 |
| 5,637,968 | A | 6/1997 | Kainec et al. | |
| 6,134,973 | A * | 10/2000 | Schoeps | 73/862.23 |
| 6,341,533 | B1 * | 1/2002 | Schoeps | 73/862.23 |
| 6,516,896 | B1 * | 2/2003 | Bookshar et al. | 173/1 |
| 6,668,212 | B2 | 12/2003 | Colangelo, III et al. | |
| 6,680,595 | B2 * | 1/2004 | Ito | 318/424 |
| 6,796,525 | B2 | 9/2004 | Johnsson et al. | |
| 6,868,742 | B2 * | 3/2005 | Schoeps | 73/862.21 |
| 7,089,080 | B1 * | 8/2006 | Lysaght | 700/160 |
| 2007/0103102 | A1 * | 5/2007 | Friberg | 318/254 |
| 2007/0151740 | A1 * | 7/2007 | Friberg et al. | 173/1 |

FOREIGN PATENT DOCUMENTS

| | | | |
|---|---|---|---|
| EP | 0621109 | A1 | 10/1994 |
| GB | 1233507 | A | 5/1971 |
| WO | WO 02083366 | A1 | 10/2002 |
| WO | WO 02803366 | A1 | 10/2002 |
| WO | WO 02102554 | A1 | 12/2002 |

* cited by examiner

METHOD FOR GOVERNING THE OPERATION OF A PNEUMATIC IMPULSE WRENCH AND A POWER SCREW JOINT TIGHTENING TOOL SYSTEM

FIELD OF THE INVENTION

The invention relates to a method and a power tool system for screw joint tightening, where the power tool system comprises a pneumatic impulse wrench, and a programmable control unit is arranged to control the operation of the impulse wrench according to a predetermined tightening strategy and in response to instantaneous values of one or more tightening parameters by regulating during tightening the pressure air supply to the impulse wrench.

BACKGROUND OF THE INVENTION

A problem concerned with pneumatically powered impulse wrenches is the difficulty to govern the tightening process accurately enough to ensure a correct and reliable pre-tensioning result. In a previously known impulse wrench system, described in U.S. Pat. No. 5,366,026, the output shaft of an impulse wrench is provided with a torque transducer for detecting the torque magnitudes of the delivered torque impulses, and a control unit for calculating a torque based clamping force and for initiating power shut-off as a certain co-efficient representing an increasing clamping force has reached a certain value. There is also described a way to more safely arrive at the desired final clamping force by reducing the motive pressure air supply to the impulse wrench as the difference between a desired final clamping force and the actual calculated clamping force is smaller than a predetermined value.

This known tightening system has two weak points from the reliability point of view, namely that the actual instantaneous tightening parameter values, like the torque magnitude, are obtained from an easily disturbed torque transducer including a magnetostrictive output shaft portion and electric coils mounted in the impulse wrench housing. This arrangement is not only sensitive to external disturbances resulting in a less reliable torque magnitude detection but it is rather space demanding and adds in a negative way to the outer dimensions of the impulse wrench. The magnetostrictive output shaft comprises a number of slots which weaken the shaft and call for an enlarged output shaft diameter.

Although this prior art patent describes a process control where the output torque of the impulse wrench is reduced as the clamping force magnitude approaches the target value, there is still a problem involved when tightening so called hard joints, i.e. joints having a steep torque growth characteristic. This is due to the fact that the very first impulse delivered by the impulse wrench could turn out to be powerful enough to cause a torque overshoot, i.e. reaching a torque magnitude that is higher than the desired final torque level. There is nothing described in this document about how to deal with this problem.

In WO 02/083366 there is described a technique for determining the installed torque based on signals delivered by an angle sensing means mounted on the inertia drive member of the impulse unit. This technique means that the delivered torque is calculated from the angular movements per time unit of the impulse unit, and that no torque sensing means on the output shaft is required. However, there is nothing described about how to control a screw joint tightening process by changing the output of the impulse wrench during the tightening process, for instance how to avoid over-tightening at the very first delivered torque impulse at hard joints.

In U.S. Pat. No. 6,668,212 there is described a method for tightening screw joints by means of a pneumatic torque delivering tool wherein the accuracy of the tightening results is improved by using calibration factors for power tool temperature, power tool age etc. and by varying the air inlet pressure to the power tool. This method is based on pre-production calibration procedures where the calibration factors for the actual screw joint and the different air pressure levels to be used during tightening are determined. Since this previous method does not use a power tool provided with torque sensing means the output torque of the tool has to be correlated to corresponding air pressure levels which are listed in a table, and when applying the power tool on a screw joint of a certain size the list tells the operator what air pressure levels should be used to safely achieve a desired final torque in the screw joint. Accordingly, this known method is not universally applicable on different screw joints but require a pre-production calibration procedure on the actual screw joint. This is disadvantageous in that it is complicated and time consuming.

SUMMARY OF THE INVENTION

It is an object of the invention to provide a method for governing a screw joint tightening process performed by a pneumatic impulse wrench which does not require any pre-tightening calibration procedures and which is controlled in such a way that overtightening of the screw joint is safely avoided under all conditions, and to provide a power tool system for performing the method and including a pneumatic impulse wrench which combines a simple and compact design with a reliable parameter magnitude sensing and ascertaining.

A preferred embodiment of the invention is described below with reference to the accompanying drawing.

DETAILED DESCRIPTION

Figure 1:
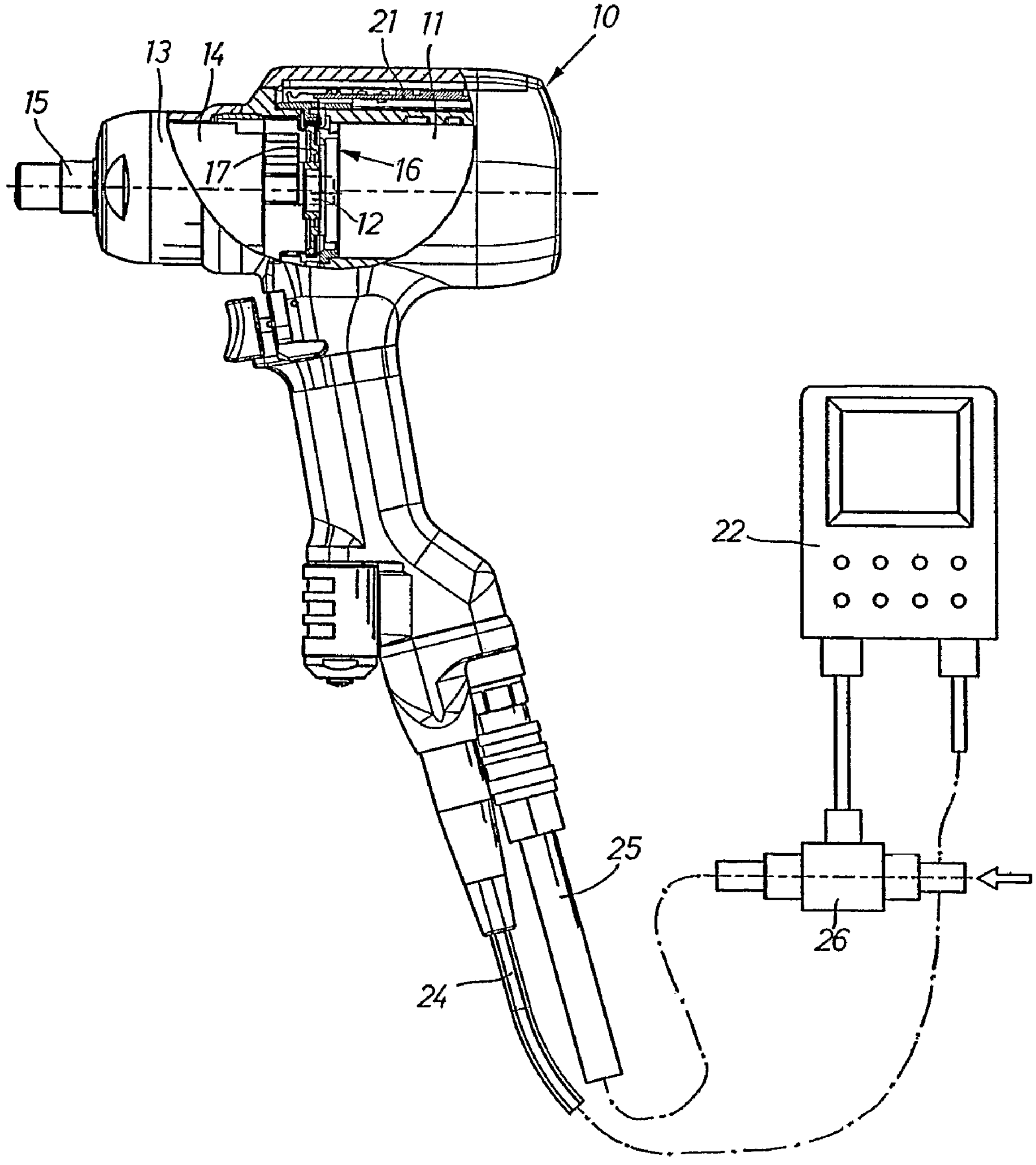
FIG. 1 illustrates a power tool system according to the invention.
Figure 2:
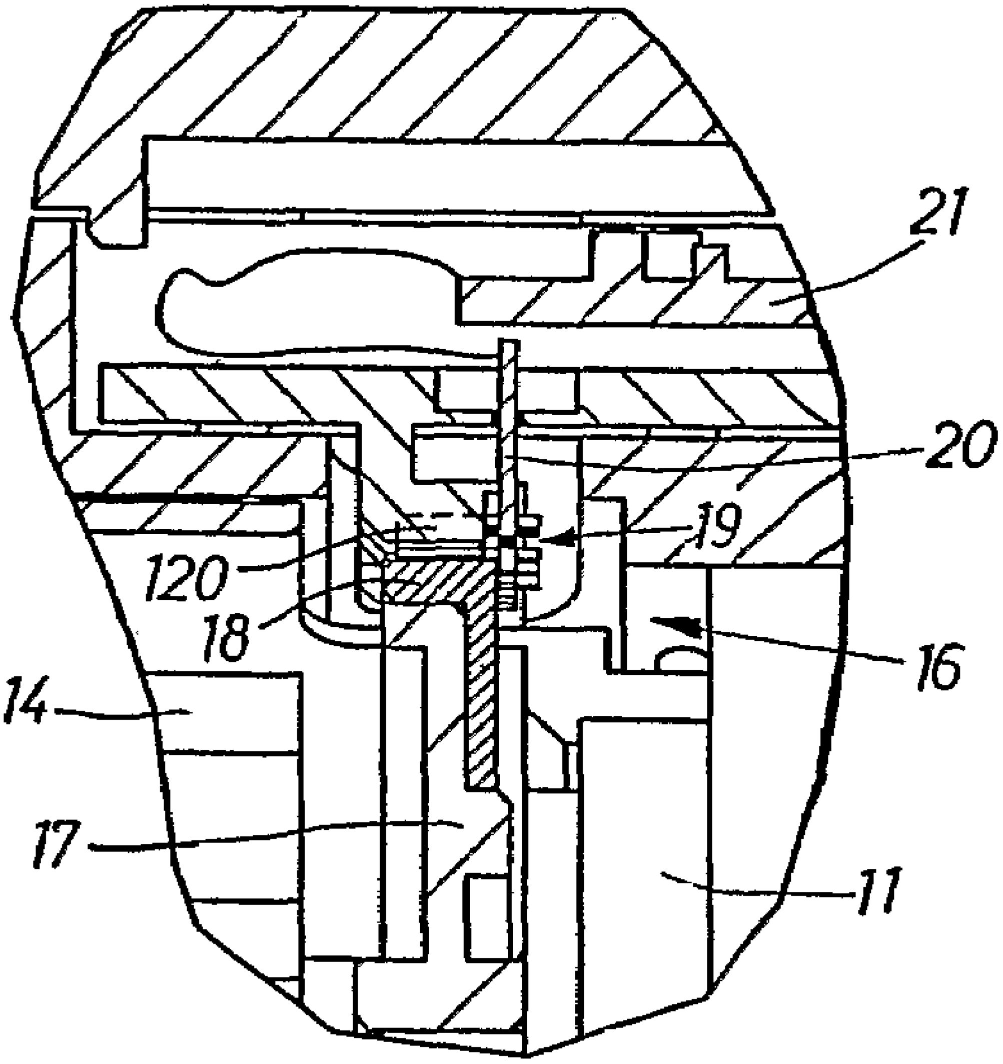
FIG. 2 shows an enlarged fractional view of the impulse wrench shown in FIG. 1 and illustrates the angular movement sensing device.

The power tool system illustrated in FIG. 1 comprises a pneumatic impulse wrench 10 including a motor 11 with a rotor 12, an impulse unit 13 including an inertia drive member 14 connected to the motor rotor 12, and an output shaft 15. The impulse wrench 10 further comprises an angular movement detecting device 16 which includes a disc 17 with a magnetised rim portion 18. The disc 17 is rigidly affixed to and co-rotating with the inertia drive member 14, and a stationary sensing device 19 located approximately to the magnetised rim portion 18 of the disc 17. The rim portion 18 is magnetised to provide a number of magnetic poles equally distributed along its periphery, and the sensing device 19 comprises sensor elements 120 carried on a connection board 20 and activated by the magnetic poles of the rim portion 18 to deliver electric signals in response to the movement of the disc 17. The connector board 20 is coupled to a circuit board 21 which carries a number of electronic components (not shown) for treating the signals delivered by the sensor elements 120 and sending secondary signals to a stationary programmable control unit 22 via a multi-core cable 24. Pressure air is supplied to the impulse wrench via a hose 25 and a flow regulating valve 26 which communicates with a pressure air source and which is connected to the control unit 22 for receiving operating signals. The flow regulating valve 26 is of the type that is able to adjust the air flow magnitude successively in the range between zero and full power flow as determined by the signals delivered by the control unit 22.

The signals delivered by the movement detecting device 16 correspond to the rotational movement of the drive member 14 and are used for calculating not only the speed and retardation of the drive member 14 but also the installed torque, because with the knowledge of the total inertia of the rotating parts, i.e. the drive member 14 and the connected motor rotor 12, the energy and hence the installed torque magnitude of each delivered torque impulse may be calculated. This method of torque calculation is previously described per se in the above mentioned WO 02/083366.

In addition to the above described method of calculating and determining the delivered torque and lapsed rotation angle during each torque impulse it is also possible to calculate the torque rate of the screw joint, i.e. the torque growth per angle increment. This is accomplished during a first couple of impulses delivered to the screw joint, and when the torque rate is calculated an determined it is possible to adapt the continued impulse application to the screw joint in a very accurate way, without having to rely on pre-tightening calibration procedures on the actual screw joint.

This means that the method according to the invention is universally applicable on all screw joints within a certain size range. By this new method occurring deviations in torque rate between different screw joints are automatically compensated for, and occurring screw joint faults like misalignments, cross threading, ripped-off threads etc. are immediately detected as abnormal torque growth characteristics.

In contrast to previously described conventional methods for accomplishing a screw joint tightening control at pneumatically driven impulse tools, the present invention makes it possible to control the tightening process via the inlet air pressure and without having to perform any pre-production test runs to calibrate the torque output of the actual power tool in relation to the supplied air pressure and other factors like temperature, power tool age etc. According to the present invention the output torque as well as the torque growth are determined momentarily during tightening process, and the inlet air pressure is immediately adapted to the actual joint conditions such that a desired tightening result is ensured, irrespective of the characteristics of the actual screw joint. The power tool just has to be programmed with the desired target torque level and a chosen strategy for varying the inlet air pressure during the tightening process in response to the set target torque level and the calculated torque growth. No pre-production test runs on the actual screw joint have to be performed for calculation purposes.

Based on this previously described torque determination method the operation of the impulse wrench is governed by controlling the pressure air supply to the impulse wrench motor via the flow regulating valve 26. According to the invention the pressure air supply is controlled such that a reduced motor power and speed is obtained before and during the very first one or two delivered torque impulse or impulses, where a torque growth calculation is performed. Thereafter a full power air pressure is supplied to the impulse wrench motor. When reaching a certain torque magnitude which preferably is a certain percentage of the set target torque level, for instance 80% of the target torque level, the air flow regulating valve 26 is instructed by the control unit 22 to reduce the air supply flow and hence the motive air pressure to a certain level or a predetermined percentage of the full power flow, for instance 80% of the full power flow, to thereby reduce the rotation speed of the power tool 10 towards the end of the tightening process and minimise the risk of overtightening the screw joint due to the influence of inertia related dynamic forces. As the set target torque level is reached the flow regulating valve 26 is instructed to further reduce the air supply flow so as to interrupt the tightening process either by stopping the impulse wrench or by maintaining the installed torque magnitude via a continued impulse delivery at a further decreased air pressure and reduced torque magnitude in each impulse.

The invention claimed is:

1. A method for tightening a screw joint to a desired target torque level using an impulse wrench having an impulse unit with a motor driven inertia drive member, and a programmable control unit arranged to control a power supply to the impulse wrench, said method comprising:

- starting a screw joint tightening process at a reduced power supply to the impulse wrench,
- ascertaining an angular displacement and a retardation magnitude of the inertia drive member during each delivered impulse,
- calculating an instantaneous torque magnitude and a torque growth during a number of delivered impulses,
- increasing after a very first delivered impulse the power supply to the impulse wrench in response to the calculated torque growth,
- reducing the power supply to the impulse wrench in response to the instantaneous torque magnitude and to the calculated torque growth during each impulse as the instantaneous torque magnitude reaches a predetermined percentage of the desired target torque level, and
- interrupting the power supply to the impulse wrench as the target torque level is reached.

2. The method according to claim 1, wherein the power supply is increased after the very first delivered impulse to an optimum magnitude determined by the calculated torque growth and an installed torque magnitude during the very first delivered impulse in relation to the target torque level.

3. A power wrench system for tightening a screw joint to a desired target torque level, comprising:

- a torque impulse wrench,
- a programmable control unit, and
- a power supply connected to the impulse wrench and governed by the control unit,
- wherein the impulse wrench comprises an impulse unit with a motor driven inertia drive member, and an angle sensor connected to said inertia drive member to detect an angular movement of said inertia drive member, and
- wherein:
  - said power supply is controlled to supply the impulse wrench with a reduced power until a very first impulse is delivered to the screw joint,
  - said control unit is arranged to receive signals from the angle sensor and to determine an angular displacement and a retardation magnitude of the inertia drive member during each delivered impulse, and to calculate a delivered torque as well as a torque growth per angle increment during each impulse, and
  - said control unit is arranged to increase the power supply to the impulse wrench after the very first impulse has been delivered, to reduce the power supply to the impulse wrench as an instantaneous torque magnitude reaches a predetermined percentage of the target torque level, and to interrupt the power supply to the impulse wrench as the target torque level is reached.

4. The power wrench system according to claim 3, wherein the impulse wrench is pneumatically powered, and said power supply comprises a valve connected to the control unit and arranged to vary a pressure air supply to the impulse wrench between zero and a full power flow as determined by the control unit.

* * * * *